United States Patent
Kim et al.

(10) Patent No.: US 7,212,613 B2
(45) Date of Patent: May 1, 2007

(54) SYSTEM AND METHOD FOR TELEPHONIC VOICE AUTHENTICATION

(75) Inventors: Moon J. Kim, Wappingers Falls, NY (US); Marc Segre, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 481 days.

(21) Appl. No.: 10/666,103

(22) Filed: Sep. 18, 2003

(65) Prior Publication Data

US 2005/0063522 A1    Mar. 24, 2005

(51) Int. Cl.
*H04M 1/64* (2006.01)
(52) U.S. Cl. .................... 379/88.02; 704/246; 704/273
(58) Field of Classification Search ... 379/88.01–88.04
See application file for complete search history.

(56) References Cited

U.S. PATENT DOCUMENTS

| | | | |
|---|---|---|---|
| 5,231,670 A * | 7/1993 | Goldhor et al. .............. 704/275 |
| 5,499,288 A | 3/1996 | Hunt et al. |
| 5,548,647 A * | 8/1996 | Naik et al. .................. 704/200 |
| 5,717,743 A | 2/1998 | McMahan et al. |
| 5,752,231 A * | 5/1998 | Gammel et al. ............ 704/273 |
| 5,991,617 A | 11/1999 | Powell |
| 6,061,653 A * | 5/2000 | Fisher et al. ............. 704/256.5 |
| 6,078,807 A | 6/2000 | Dunn et al. |
| 6,185,536 B1 * | 2/2001 | Haber et al. ................ 704/273 |
| 6,192,255 B1 | 2/2001 | Lewis et al. |
| 6,219,407 B1 * | 4/2001 | Kanevsky et al. ........ 379/88.02 |
| 6,233,556 B1 | 5/2001 | Teunen et al. |
| 6,377,699 B1 | 4/2002 | Musgrave et al. |
| 6,389,397 B1 | 5/2002 | Otto |
| 6,393,305 B1 | 5/2002 | Ulvinen et al. |
| 6,480,825 B1 * | 11/2002 | Sharma et al. ............... 704/270 |
| 6,577,997 B1 * | 6/2003 | Gong .......................... 704/252 |
| 6,697,778 B1 * | 2/2004 | Kuhn et al. ................. 704/243 |
| 6,810,116 B1 * | 10/2004 | Sorensen et al. ...... 379/202.01 |
| 2003/0023882 A1 | 1/2003 | Udom |
| 2003/0046554 A1 | 3/2003 | Leydier et al. |

* cited by examiner

*Primary Examiner*—Fan Tsang
*Assistant Examiner*—Simon Sing
(74) *Attorney, Agent, or Firm*—Douglas A. Lashmit; Hoffman, Warnick & D'Alessandro LLC

(57) ABSTRACT

A voice biometric authentication system and method. An authentication system is provided for authenticating a user of a telephonic device, comprising: a setup system for capturing and storing an authentic user voice sample; a comparison system that compares the authentic user voice sample with an inputted voice sample and generates a comparison result; and a control system for controlling access to the telephonic device, wherein the control system: analyzes the comparison result for an initial inputted voice sample received when a telephone call is initiated; and periodically analyzes comparison results for ongoing inputted voice samples received during the telephone call.

12 Claims, 3 Drawing Sheets

SYSTEM AND METHOD FOR TELEPHONIC VOICE AUTHENTICATION

BACKGROUND OF THE INVENTION

1. Technical Field

The present invention relates generally to authenticating a person's voice for accessing a device, and more specifically relates to a continuous voice authentication system and method for telephonic devices.

2. Related Art

As new telephony technologies continue to emerge, the ability to authenticate users will become more and more important. For instance, as wireless devices become smaller, they become much easier to steal, misplace or lose. If such devices can only be utilized by authorized users, the owners or service providers of the devices need not be concerned about unauthorized use. In addition to the actual devices themselves, the information being transmitted is also susceptible to unauthorized use. Accordingly, systems are required to ensure that an individual receiving information over a telephone network is authorized to receive it.

Numerous technologies exist for utilizing voice recognition to authenticate users. For instance, U.S. Pat. No. 6,393,305 B1, "Secure Wireless Communication User Identification by Voice Recognition," issued to Ulvinen et al., on May 21, 2002, which is hereby incorporated by reference, discloses a method of authenticating a user of a wireless device using voice recognition. Similarly, U.S. Pat. No. 5,499,288, "Simultaneous Voice Recognition and Verification to Allow Access to Telephone Network Services," issued to Hunt et al., on Mar. 12, 1996, which is hereby incorporated by reference, discloses a voice recognition system for enabling access to a network by entering a spoken password.

While such prior art references address the need for authenticating users of telephonic systems using voice recognition, the authentication processes are limited in that once a user is initially authenticated, no further steps are taken to ensure the validity of the user. Thus, if an unauthorized user could overcome the authentication process once (e.g., by speaking a password in a manner to fool the system), the user would have unimpeded access to use the device or the information available over the network.

Accordingly, a need exists for a voice recognition system that provides a higher degree of authentication for users of telephonic systems.

SUMMARY OF THE INVENTION

The present invention addresses the above-mentioned problems, as well as others, by providing a voice biometric authentication system that continuously analyzes input voice samples for authenticating users of a voice based system. In a first aspect, the invention provides an authentication system for authenticating a user of a telephonic device, comprising: a setup system for capturing and storing an authentic user voice sample; a comparison system that compares the authentic user voice sample with an inputted voice sample and generates a comparison result; and a control system for controlling access to the telephonic device, wherein the control system: analyzes the comparison result for an initial inputted voice sample received when a telephone call is initiated; and periodically analyzes comparison results for ongoing inputted voice samples received during the telephone call.

In a second aspect, the invention provides an authentication system for authenticating a plurality of users accessing a conference call, comprising: a setup system for capturing and storing an authentic voice sample for each of the plurality of users; and a control system that controls user access to the conference call based on comparison results of inputted voice samples with the authentic voice samples, wherein the control system includes: a system for analyzing the comparison results for an initial inputted voice sample for a joining user when the joining user joins the conference call; and a system for periodically analyzing comparison results for ongoing inputted voice samples for each user during the conference call.

In a third aspect, the invention provides a method for authenticating a user of a telephonic device, comprising: capturing and storing an authentic voice sample for the user; initiating a telephone call on the telephonic device; comparing an initial inputted voice sample with the authentic voice sample; deciding whether to terminate the telephone based on the compare step for the initial inputted voice sample; periodically comparing ongoing inputted voice samples obtained during the telephone call with the authentic voice sample; and deciding whether to terminate the telephone based on the periodic compare step for the ongoing inputted voice samples.

In a fourth aspect, the invention provides a method for authenticating a plurality of users accessing a conference call, comprising: capturing and storing an authentic voice sample for each user; initiating access of a joining user to the conference call; comparing an initial inputted voice sample of the joining user with the authentic voice samples; deciding whether to allow access to the conference call based on the compare step for the joining user; periodically comparing ongoing inputted voice samples for all joined users obtained during the conference call with the authentic voice samples; and deciding whether to terminate access to the conference call for any of the joined users based on the periodic compare step.

In a fifth aspect, the invention provides an authentication system for authenticating a user of a voice processing system, comprising: a setup system for capturing and storing an authentic user voice sample; a system for obtaining inputted voice samples; a comparison system that compares the authentic user voice sample with an inputted voice sample and generates a comparison result; and a control system for controlling access to a device associated with the voice processing system, wherein the control system periodically analyzes comparison results generated for ongoing inputted voice samples in order to continuously control access to the device.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
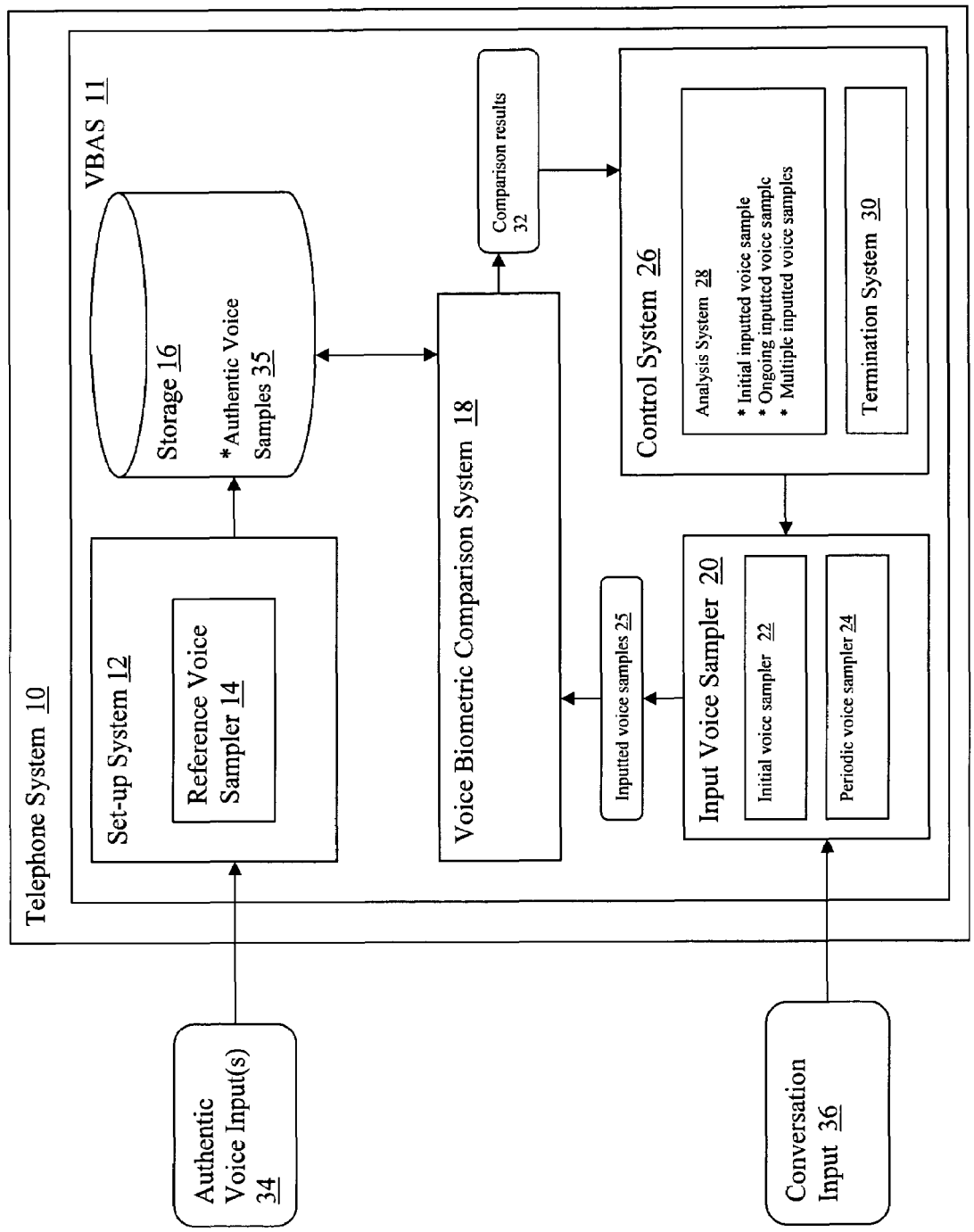
FIG. 1 depicts a telephone system having a voice biometric authentication system in accordance with the present invention.

Referring now to the drawings, FIG. 1 depicts a telephone system 10 having a voice biometric authentication system (VBAS) 11 for authenticating users of telephone system 10. Telephone system 10 may comprise any type of telephonic device through which voice information can be communicated, including, e.g., a wireless or cellular phone, a satellite phone, a multi-user phone system such as a company-based phone system, a conference call system, a land-line based telephone, an internet telephone, a network, etc. Note that while the invention is described herein with reference to a telephone system, the biometric authentication features and concepts described herein could be embodied in any voice processing system. For instance, the voice biometric authentication system of the present invention could be embedded in a smartcard that included an embedded voice biometrics reader to aurally authenticate the holder of the card.

Set-up

As an initial step, VBAS 11 must first store one or more authentic voice samples 35 that can later be used as a reference to determine authenticity of the user. In the exemplary embodiment of FIG. 1, telephone system 10 includes a set-up system 12 having a reference voice sampler 14 for capturing and sampling one or more authentic voice inputs 34 for each authorized user of the telephone system 10. Captured authentic voice inputs 34 are then stored as authentic voice samples 35 in storage device 16. In an exemplary embodiment involving a cellular phone, authentic voice samples 35 can be captured and stored by an authorized user by, e.g., speaking a phrase into the receiver during a set-up procedure. The digital signature of each authorized user can then be stored in the existing hardware of the cell phone. In another exemplary embodiment involving a multi-user phone system, authentic voice samples 35 for each authorized user can be stored in a central location or server utilized by the phone system (e.g., similar to a voice mail system). Obviously, any method for capturing and storing authentic voice samples could be utilized with departing from the scope of the invention.

Once the set-up is complete and an authentic voice sample 35 is stored for each authorized user, any individual, or group attempting to utilize the telephone system 10 can be authenticated. If authentication fails, access to telephone system 10 can be denied or terminated, e.g., by denying access to a feature, by terminating the call, removing the individual from a conference call, etc.

Authentication

In order to authenticate users, VBAS 11 includes an input voice sampler 20 for receiving and sampling conversation input 36; voice biometric comparison system 18 for comparing inputted voice samples with authentic voice samples 35; and a control system 26 for analyzing comparison results 32 from voice biometric comparison system 18.

Input voice sampler 20 may include: (1) an initial voice sampler 22 for sampling an initial conversation utterance from a user, and (2) a periodic voice sampler 24 for sampling ongoing conversation input from the user. (The input voice sampler 20 may be implemented together with the reference voice sampler 14.) The initial conversation utterance can comprise any initial voice input, such as the first few words spoken by the user, or a code word or phrase spoken by the user. Ongoing conversation input generally comprises aural information spoken by the user during the lifetime of the conversation. Periodic voice sampler 24 can collect input voice samples at any interval, or in any manner, e.g., every N seconds, each time the user speaks, etc.

After an input voice sample is collected, it is passed to voice biometric comparison system 18. Generally, each voice has its own unique signature measurable in frequency and amplitude. Voice biometric analysis is a fairly well developed field, and techniques for comparing signatures are known in the art. Voice biometric comparison system 18 can utilize any known or later developed mechanism, system or algorithm for comparing the input voice sample of the user with the authentic voice sample(s) 35 saved in storage 16. In the exemplary embodiment, voice biometric comparison system 18 generates comparison results 32 for each compare. Comparison results 32 can comprise any type of information that reflects the analytical results of comparing two voice samples. Possible result formats may include a binary outcome such as "match" or "no-match"; a raw score indicating a probability of a match, such as "70% match"; an error condition, such as "invalid sample"; etc.

Comparison results 32 are forwarded to control system 26. Control system 26 includes an analysis system 28 that examines the comparison results 32 and either allows the call to proceed or terminates the call (or denies access to the call) using termination system 30. An important aspect of the invention is the fact that authentication of the user is continuous. Specifically, because the control system 26 receives ongoing or periodic comparison results 32 for the accessing user, the control system 26 is able to terminate access to the system 10 at any time during the conversation. Thus, while an unauthorized user may be able to trick the system to gain initial access, ongoing access can be terminated at any time during the call if one of the ongoing inputted voice samples fails to match one of the authentic voice samples 35.

Analysis system 28 may include various modules for analyzing or responding to comparison results 32. For instance, in the case of an initial inputted voice sample, the analysis system 28 may cause an additional voice sample to be collected and analyzed in the event of a "no-match" situation. Alternatively, analysis system 28 may simply cause access to the telephone system 10 to be denied.

In the case of ongoing inputted voice samples, analysis system 28 may collect and analyze multiple, or a series of, comparison results 32. Thus, the analysis system 28 can achieve a much higher level of confidence in authenticating a user. For instance, analysis system 28 could average probability scores for a set of comparison results 32. The average could then be compared to a threshold value to determine whether or not to terminate access.

Assume an average probability score of 0.75 is required to maintain access to telephone system 10, and voice comparison system 18 generated a set of comparison results 32 for five sequential inputted voice samples as follow: R1=0.7, R2=0.6, R3=0.9, R4=0.9, and R5=0.9. The average value would be 0.8, which would pass the threshold of 0.75, indicating a "match" situation. Note however that if only result R1 or R2 were used, a "no-match" situation would arise, potentially resulting in an unwarranted denial of access. It should be recognized that any algorithm or system for analyzing a set or series of comparison results could be utilized without departing from the scope of the invention.

Figure 2:
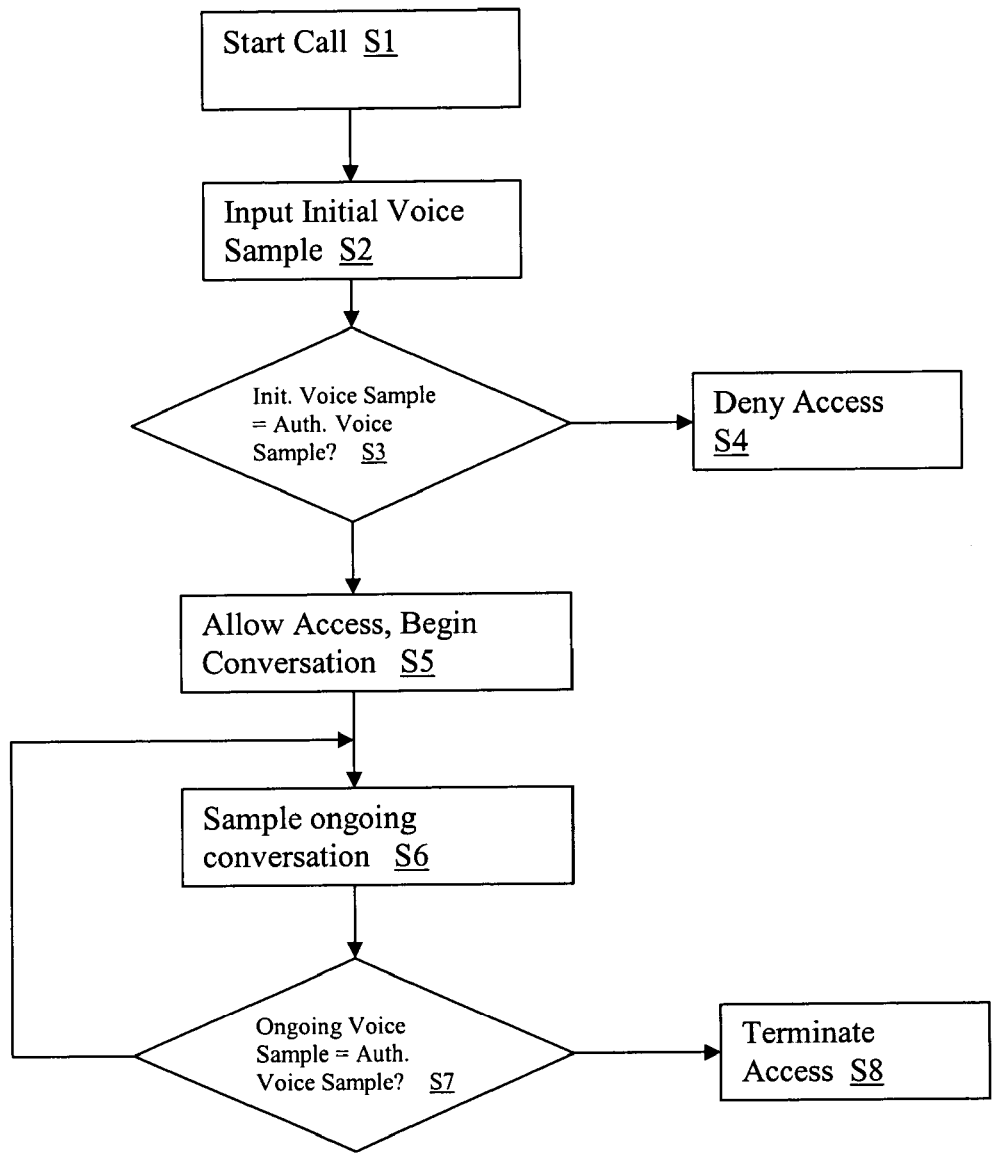
FIG. 2 depicts a flow diagram for authenticating a cell phone user in accordance with the present invention.

FIG. 2 depicts a flow diagram for a method of making a telephone call from a cell phone utilizing the principals of the present invention. It is assumed that the cell phone has already been through the set-up procedure and an authorized voice sample has been stored. At step S1, the call is initiated. Next, at step S2, an initial voice sample is inputted into the receiver of the phone. At step S3, the initial voice sample is compared to the authorized voice sample and access is denied at step S4 if they do not match. If they do match, access to the cell phone is allowed, and the conversation begins at step S5.

During the conversation an ongoing voice sample is obtained at step S6. At step S7, the ongoing voice sample is compared to the authorized voice sample. If a match does not exist, further access is terminated at step S8. Otherwise, logic flows back to step S6, where the sample and test procedures of steps S6 and S7 are continuously repeated during the conversation. Accordingly, a continuous authorization process is provided.

Figure 3:
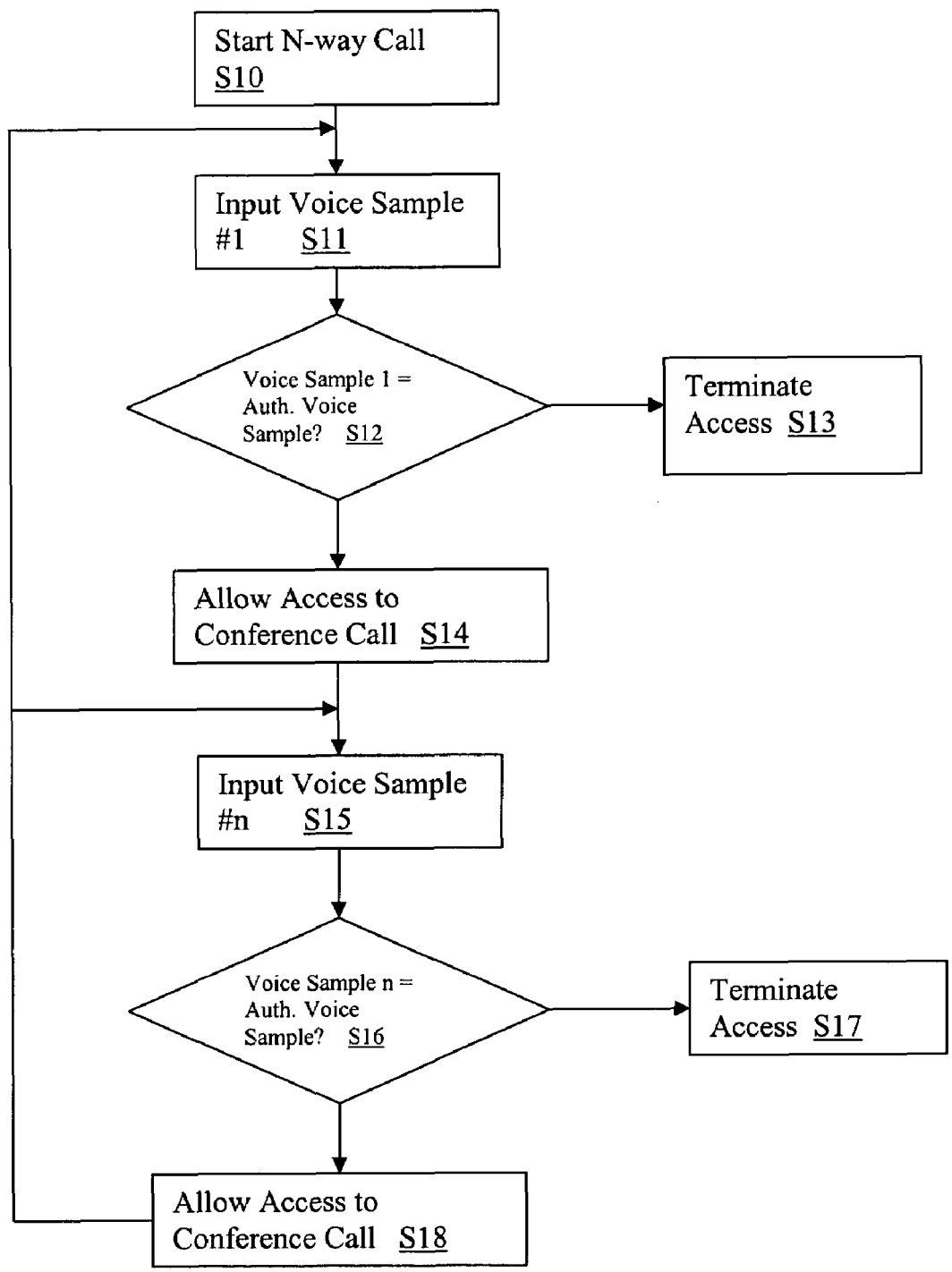
FIG. 3 depicts a flow diagram for authenticating conference call users in accordance with the present invention.

FIG. 3 depicts a flow diagram for a method of making an N-way conference call utilizing the principals of the present invention. It is assumed that the phone system has already been through the set-up procedure and each of N authorized voice samples have been stored. At step S10, the N-way call is started, and an input voice sample #1 for the first participant is captured at step S11. At step S12, a test occurs to determine if input voice sample #1 matches one of the authorized voice samples. If no match is found, access for the first participant is terminated at step S13. If a match is found, the first participant is allowed access to the conference call at step S14.

Next, at step S15, an input voice sample #n is captured for the nth participant. At step S16, a test occurs to determine if input voice sample #n matches one of the authorized voice samples. If no match is found, access for the nth participant is terminated at step S17. If a match is found, the nth participant is allowed access to the conference call at step S18. Subsequently, the logic continuously repeats for each of the n participants to ensure that each is an authorized participant throughout the course of the conference call, thus providing continuous testing throughout the conference call.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. An authentication system for authenticating a user of a telephonic device, comprising:
   a setup system for capturing and storing an authentic user voice sample;
   a comparison system that compares the authentic user voice sample with an inputted voice sample and generates a comparison result in the form of a probability score; and
   a control system for controlling access to the telephonic device, wherein the control system:
      analyzes the probability score for an initial inputted voice sample received when a telephone call is initiated;
      periodically analyzes a plurality of probability scores for ongoing inputted voice samples received during the telephone call; and
      terminates the telephone call if an average of the plurality of probability scores is less than a predetermined threshold for ongoing inputted voice samples.

2. The authentication system of claim 1, wherein the control system analyzes comparison results for a plurality of ongoing inputted voice samples in order to determine if the telephone call should be terminated.

3. The authentication system of claim 1, wherein the telephonic device is a portable phone.

4. The authentication system of claim 1, wherein the telephonic device comprises a system that provides access to a conference call.

5. A method for authenticating a user of a telephonic device, comprising:
   capturing and storing an authentic voice sample for the user;
   initiating a telephone call on the telephonic device;
   comparing an initial inputted voice sample with the authentic voice sample;
   deciding whether to terminate the telephone based on the compare step for the initial inputted voice sample;
   periodically comparing ongoing inputted voice samples obtained during the telephone call with the authentic voice sample and generating a probability score for each compare step; and
   terminating the telephone call if an average of the probability scores is less than a predetermined threshold.

6. A method for authenticating a plurality of users accessing a conference call, comprising:
   capturing and storing an authentic voice sample for each user at a centralized location;
   initiating access of a joining user to the conference call;
   comparing an initial inputted voice sample of the joining user collected at the centralized location by a sampling system with the authentic voice samples;
   deciding whether to allow access to the conference call based on the compare step for the joining user;
   periodically comparing ongoing inputted voice samples for all joined users obtained during the conference call by the sampling system with the authentic voice samples, and generating a probability score for each periodic compare; and
   terminating access to the conference call for the joining user if an average of the probability scores associated with the joining user is less than a predetermined threshold.

7. The method of claim 6, wherein the step of deciding whether to allow access to the conference call based on the compare step for the initial inputted voice sample includes the step of:

denying access to the conference call if the initial inputted voice sample does not match one of the authentic voice samples.

8. The method of claim 7, further comprising the step of:

terminating the conference call for a joined used if one of the ongoing inputted voice samples of the joined user does not match one of the authentic voice samples.

9. The method of claim 7, further comprising:

analyzing comparison results for a plurality of ongoing inputted voice samples for a joined user; and terminating access to the conference call for the joined user if multiple ongoing inputted voice samples do not match one of the authentic voice samples.

10. An authentication system for authenticating a user of a voice processing system, comprising:

a setup system for capturing and storing an authentic user voice sample;

a system for obtaining inputted voice samples;

a comparison system that compares the authentic user voice sample with an inputted voice sample and generates a probability score; and a control system for controlling access to a device associated with the voice processing system, wherein the control system periodically analyzes probability scores generated for ongoing inputted voice samples during a call in order to continuously control access to the device and terminates access to the device if an average of the probability scores is less than a predetermined threshold.

11. The authentication system of claim 10, wherein the device is selected from the group consisting of: a smart card, a wireless phone, and a phone system.

12. The authentication system of claim 10, wherein the control system collects and analyzes a series of probability scores for a plurality of periodically inputted voice samples in order to control access to the device.

* * * * *